(12) United States Patent
Naruse et al.

(10) Patent No.: US 7,337,274 B2
(45) Date of Patent: Feb. 26, 2008

(54) COMPUTER AND CONTROL METHOD

(75) Inventors: Akira Naruse, Kawasaki (JP); Kouichi Kumon, Kawasaki (JP); Mitsuru Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 10/841,619

(22) Filed: May 10, 2004

(65) Prior Publication Data

US 2004/0210723 A1    Oct. 21, 2004

(51) Int. Cl.
*G06F 12/00* (2006.01)
(52) U.S. Cl. ..................... 711/130
(58) Field of Classification Search ............... 711/130, 711/133, 150, 152; 713/300
See application file for complete search history.

(56) References Cited

U.S. PATENT DOCUMENTS 6,721,892 B1 *   4/2004   Osborn et al. ............. 713/300
6,944,779 B2 *   9/2005   Alexander et al. .......... 713/300

* cited by examiner

*Primary Examiner*—Hiep T. Nguyen
(74) *Attorney, Agent, or Firm*—Staas & Halsey LLP

(57) ABSTRACT

A computer has a plurality of processors with a cache memory. When a spinwait detecting unit provided to a processor detects execution of a spinwait command, it instructs monitoring of a variable value as a spinwait end condition and changes an operating state of a processor. A value change detecting unit provided to the cache memory monitors the variable value specified by the spinwait detecting unit, and when it detects that the variable value is changed, it posts the value change to the processor so as to return the operating state into its original state.

22 Claims, 12 Drawing Sheets

COMPUTER AND CONTROL METHOD

BACKGROUND OF THE INVENTION

1. Technical Field

The present invention relates to a computer having a common memory type multiprocessor structure having a plurality of processors with a cache memory, and a control method thereof, and the invention particularly relates to the computer and the control method for improving command executing efficiency of a spinwait command to be used for a synchronizing process.

2. Description of the Related Arts

Conventionally, in a common memory type multiprocessor system in which a main memory is shared by a plurality of processors having a cache memory, spinwait is frequently used for a synchronizing process between the processors.

A typical example in which spinwait is used for the synchronizing process between the processors is spin lock. As shown in FIG. 1, a command process of spin lock is mostly realized by a procedures of a verifying unit 100 and a setting unit 102. A processes or a thread which reaches a lock acquiring point loads a variable X at step S1, and the verifying unit 100 determines at step S2 whether the variable X is, for example, 0 which is a value representing that the lock acquiring is possible. The verifying unit 100 executes spinwait which waits for spin for repeating the steps S1 and S2 until X becomes 0. The setting unit 102 sets the lock variable value X to 1 at step S3 using an interlock command such as "test_and_set" or "compare_and_jump" so as to come out of the spin lock process. When the setting of the lock variable value X to 1 is failed, the spinwait is continued in the verifying unit 100. In such a manner, the spinwait is frequently used in the verifying unit 100 which verifies the spin lock for checking whether lock acquisition is possible. Besides the spin lock, the synchronizing process between the processors in the common memory type multiprocessor system includes barrier synchronization which uses spinwait. The barrier synchronization is such that processes or threads to be synchronized have a rendezvous with each other at a synchronizing point, and in the case of the memory-based barrier synchronization, it is mostly realized by a procedure in FIG. 2. At step S1 of the setting unit 104, before the processes or the threads reach the synchronizing point, the lock variable X is 0. When the processes or the threads reach the synchronizing point, the setting unit 104 sets a bit of the lock variable X related with the corresponding process or the thread to 1 using the interlock command such as "test_and_set" or "compare_and_jump", and the sequence goes to verifying unit 106. The verifying unit 106 loads the lock variable X at step S2, and executes spinwait for spinning until the bit of all the processes or the all the threads to be barrier-synchronized becomes 1, namely, until all-variables X become 1 at step S3. When all the processes or all the threads reach the synchronization point, all variables X become 1, the sequence comes out of the spinwait process in the synchronized state, so as to proceed to a next step. Even in the barrier synchronization, the spinwait is frequently used in the verifying unit 106 for checking whether all the processes or all the threads reach the synchronization point.

Further, the spinwait is used also for synchronization with an I/O device (input/output device). In a normal I/O process, interruption is generally used for the synchronization between the processor and the I/O device. This is because the I/O device operates very slower than the processor and a loss, which is caused by that the processor continuously waits for a response from the I/O device, is large. Due to speeding-up of the I/O devices, however, the use of interruption has a negative effect on some I/O devices. In general, since interruption causes large overhead (delay), an original speed of the I/O devices cannot be efficiently used. For this reason, some high-speed I/O devices start to adopt the synchronizing process using spinwait.

The execution of spinwait is, however, wasteful. In the spinwait, the execution of one command string is repeated until a variable value which is a wait end condition is changed into a desired value by another processor or another agent such as an I/O device. It is not uncommon that a number of times of spin to be a number of repetitions occasionally becomes several hundred or several thousand, and this means that the spin processor is used wastefully. From a viewpoint of power consumption, the electric power is consumed wastefully during the spinwait.

Further, in an SMT (Simultaneous Multi-Threading architecture) processor which can execute a plurality of threads simultaneously, a thread which is executing spinwait possibly hinders another thread which is being executed. In general, in the SMT processor, a processor resource is shared between threads. Generally, the processor resource is allocated to the execution threads not uniformly, and a number and a quantity of the processor resources to be allocated changes according to statuses of the threads. Various methods of determining allocation of processor resource are suggested, but for example, the following approaches are present:

(1) reducing allocation of resources to threads where mis-cache occurs:

(2) reducing allocation of resources to threads with a lot of commands executed speculatively; and (3) reducing allocation of resources to threads with a lot of commands registered in a reservation station.

These approaches are based on concept that the processor resource is preferentially allocated to a thread having strong possibility of executing a command more smoothly. The spinwait can execute the command very smoothly. This is because since only the same command string is repeated executed, mis-cache does not occur and forecast of branching is not failed. In the SMT processors, the processor resource is preferentially allocated to a thread which is executing the spinwait by chance. As a result, allocation of the processor resources to another threads which seem to execute a command string with high productivity is reduced in comparison with the thread which is executing the spinwait, and thus the performance of the processor is possibly deteriorated.

As mentioned above, the spinwait has the following problems:

(1) wasteful power consumption; and (2) strong possibility that the performance of the SMT process is deteriorated.

A countermeasure against these problems includes a method that after starting of the spinwait is detected, the execution of spinwait is stopped, and the right condition for canceling the spinwait is posted by interruption so that the spinwait is restarted. It comes to nothing, however, that the right condition for canceling the spinwait is posted by interruption. The spinwait is originally adopted in order to reduce delay, and the use of interruption increases the time and the cost.

Further, a method of providing a hardware for exclusive use of synchronization is present. In this case, however, the cost of the hardware becomes high. At the present day, the memory-based synchronizing process is general due to the historical background such that the reduction in the cost caused by executing the synchronizing process using a general-purpose device (memory) has many advantages.

It is an object of the present invention to provide a computer and a control method which eliminate the waste of the electric power and the processor resources caused by the execution of spinwait so as to heighten the command executing efficiency.

SUMMARY OF THE INVENTION

A computer of the present invention having a plurality of processors with a cache memory is characterized by comprising: a spinwait detecting unit for, when detecting execution of a spinwait command by means of the processor, instructing monitoring of a variable value as an end condition of the spinwait and changing an operating state of the processor; and a value change detecting unit for monitoring the variable value instructed by the spinwait detecting unit, and when detecting a change in the variable value, posting the value change to the processor so as to return the operating state into an original state. When the possibility of ejecting from the spinwait is not present or the possibility is weak, the operating state of the processor is changed so that waste due to the execution of the spinwait is reduced. According to the present invention, when a small number of hardwares are added in such a manner that the spinwait detecting unit is provided to the processor and the value change detecting unit is provided to the cache memory, the waste when the possibility of ending the spinwait is not present or is weak is reduced, and thus a command executing efficiency of the processor is improved without deteriorating a characteristic of low delay of the spinwait.

When the spinwait detecting unit detects the execution of the spinwait command by means of the processor, it instructs the value change detecting unit to monitor a cache block of the cache memory for storing the variable value referred to in the execution of the spinwait command. The value change detecting unit detects that the state of the cache block is invalidated by another processor or an input/output unit, it posts the value change to the processor. When the value change detecting unit detects that the cache block is put out of the cache memory, it posts the value change to the processor.

When the spinwait detecting unit detects the execution of the spinwait command by means of the processor, it instructs the value change detecting unit to monitor a bus request to a memory address for storing the variable value referred to in the execution of the spinwait command thereinto. The value change detecting unit monitors the bus request to the memory address for storing the variable value thereinto instructed by the spinwait detecting unit, and when detecting the bus request to the memory address from another processor or an input/output unit, posts the value change to the processor.

When the processor has at least two or more operating modes including a normal mode and a low-power consumption mode, the spinwait detecting unit changes the operating mode of the processor into the low-power consumption mode when detecting the execution of the spinwait command. Further, when the value change detecting unit detects a change in the variable value as the spinwait end condition, it changes the operating mode of the processor into the normal mode. As a result, electrical power consumption can be reduced during the execution of the spinwait.

In the case where the processors have a function for stopping the execution of a program, when the spinwait detecting unit detects the execution of the spinwait command, it instructs the processor to stop the execution of the program. When the value change detecting unit detects a change in the variable value as the spinwait end condition, it instructs the processor to restart the execution of the program. As a result, the execution of the program is stopped during the execution of the spinwait, and accordingly the electrical power consumption can be reduced.

In the case where the processors have a constitution such that a plurality of threads can be executed simultaneously (SMT processor), when the spinwait detecting unit detects a thread which is executing the spinwait command, it reduces or stops allocation of a processor resource to the thread. The value change detecting unit detects the change in the variable value as the spinwait condition, it increases or restarts the allocation of the processor resource to the thread. As a result, execution of another thread program is stopped during the execution of the spinwait in the thread in the SMP processor, and a bad influence of the spinwait executing thread on another thread is avoided, sot hat the performance of the processor is improved.

The processor has a command for the exclusive use of the spinwait, and the spinwait detecting unit detects the execution of the spinwait from the execution of the command for exclusive use of the spinwait by means of the processor. Further, the spinwait detecting unit includes: a buffer for storing an command string executed by the processor thereinto; a spinwait command string for recording unit for recording the command string for exclusive use of the spinwait thereinto; and a comparison unit for, when comparing the buffer and the spinwait command string recording unit and the command strings match with each other, detecting the execution of the spinwait.

A control method for a computer having a plurality of processors with a cache memory according to the present invention is characterized in that when execution of a spinwait command by means of the processor is detected, monitoring of a variable value as an end condition of the spinwait is started, and an operating state of the processor is changed, and when a change in the variable value is detected, the value change is posted to the processor so that the operating state is returned to its original state. Details of the control method are basically the same as the case of the computer.

DETAILED DESCRIPTION OF THE PREFERRED EMBODIMENT

Figure 3:
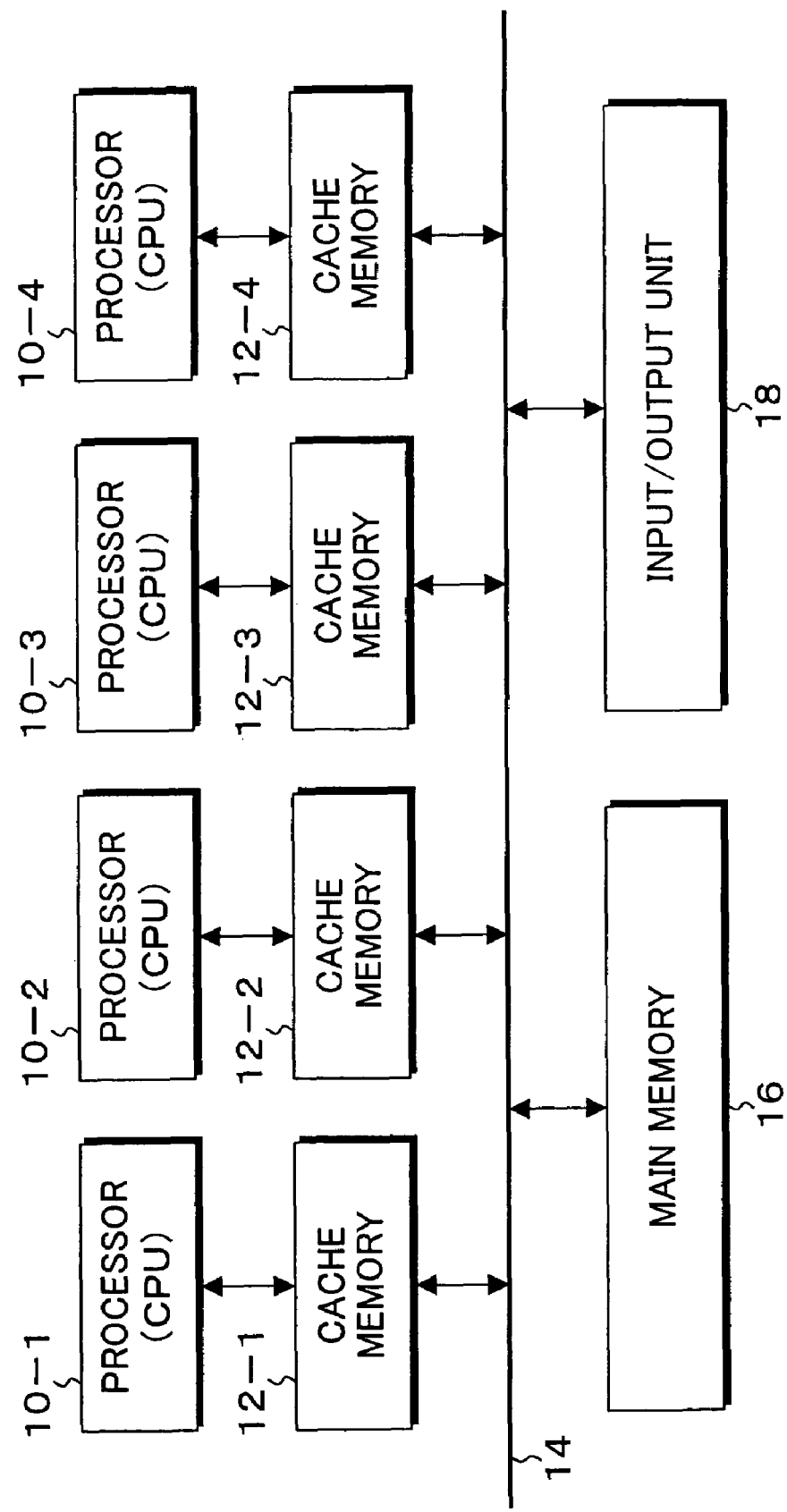
FIG. 3 is a block diagram illustrating a common memory type multiprocessor system into which the present invention is adopted.

FIG. 3 is a block diagram illustrating a common memory type multiprocessor system into which the present invention is adopted. In FIG. 3, the multiprocessor system has, for example, four processors 10-1 to 10-4, and cache memories 12-1 to 12-4 are provided to the processors 10-1 to 10-4, respectively. The cache memories 12-1 to 12-4 are connected with a main memory 16 to be used as a common memory via a bus 14. The bus 14 is connected with an input/output unit 18, and an input/output processor which serves as, for example, an input/output agent is used as the input/output unit 18. The input/output unit 18 is connected with a subsystem such as external hard disc drive HDD, a network, and input/output devices such as a keyboard, a mouse, and a display.

Figure 4:
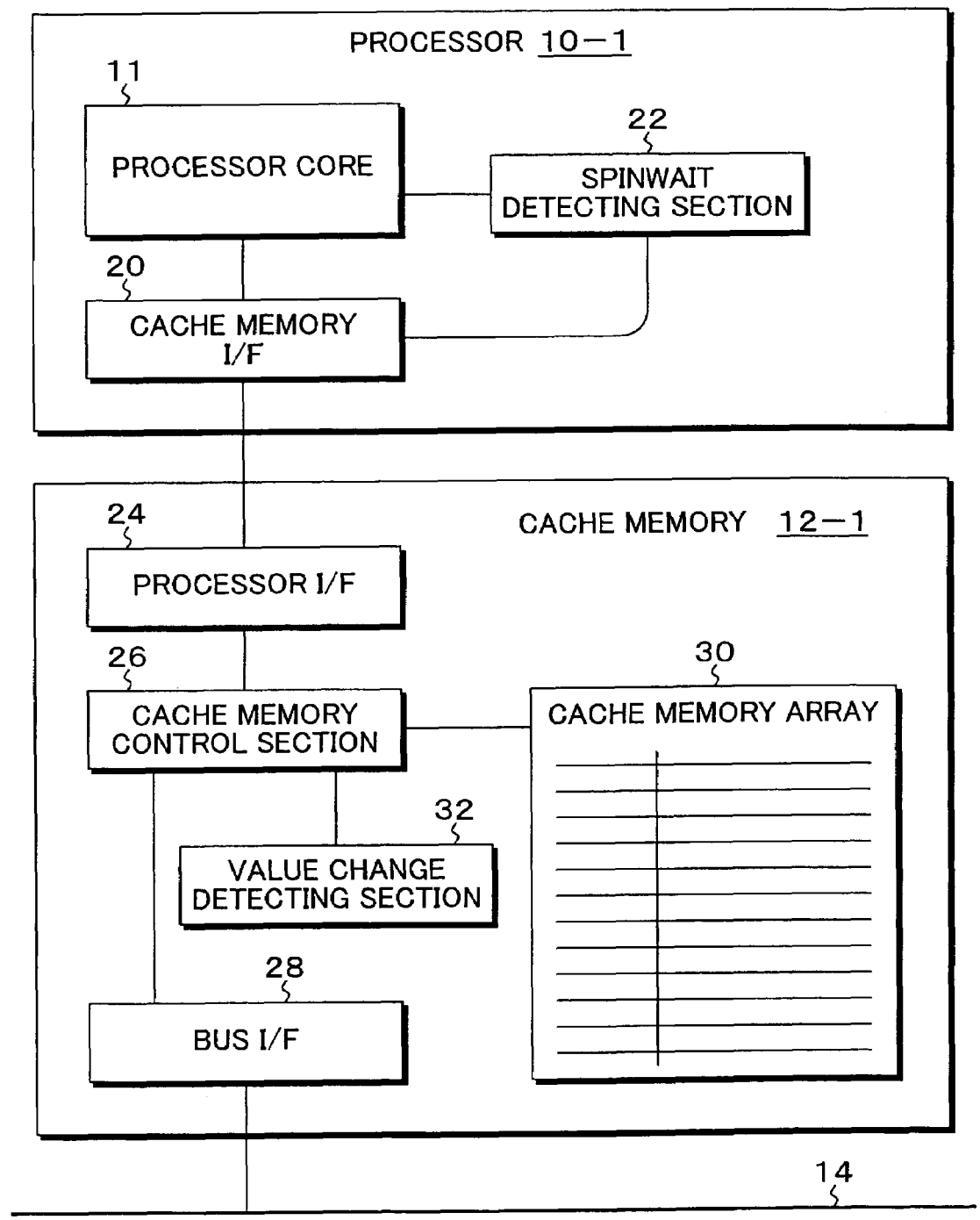
FIG. 4 is a block diagram of a processor according to an embodiment of the present invention.

FIG. 4 illustrates the processor 10-1 in FIG. 3 according to an embodiment. The other processors 10-2 to 10-4 has the same constitution. In FIG. 4, the processor 10-1 has a processor core 11 and a cache memory interface 20. The cache memory 12-1 has a processor interface 24, a cache memory control unit 26, a bus interface 28 and a cache memory array 30. The constitutions of the processor 10-1 and the cache memory 12-1 are the same as those in a conventional processor, but in the present invention, a spinwait detecting unit 22 is newly provided to the processor 10-1, and simultaneously a value change detecting unit 32 is provided to the cache memory 12-1. When the spinwait detecting unit 22 provided to the processor 10-1 detects that the processor core 11 is executing a spinwait command, the spinwait detecting unit 22 instructs the value change detecting unit 32 provided to the cache memory 12-1 to monitor a variable value which is an end condition of the spinwait, and changes an operating state of the processor 10-1. The spinwait detecting unit 22 changes the operating state of the processor 10-1 into an operating state such that the waste caused during the execution of the spinwait command is reduced. The concrete explanation is as follows.

For example, in the case where the processor 10-1 has at least two modes including a normal mode and a low-power consumption mode, when the spinwait detecting unit 22 detects the execution of the spinwait command, the operating mode of the processor is changed into the low-power consumption mode. In the case where the processor has a function for stopping the execution of a program, when the spinwait detecting unit 22 detects the execution of the spinwait command, it makes the processor stop the execution of the program. Both the switching into low-power consumption mode at the time of detecting the execution of the spinwait command, or the program execution stop prevent the waste operation and the wasteful electric power consumption of the processor due to the spin which repeats the execution of the spinwait command string until the end condition of the spinwait is changed into a predetermined value. Needless to say, the stop of the program execution by the processor at the time of detecting the spinwait command is included in one mode of the low-power consumption mode.

The value change detecting unit 32 provided to the cache memory 12-1 monitors a variable value which is the end condition of the spinwait specified by the spinwait detecting unit 22. In the case where it detects that the variable value is changed by the other processors 10-2 to 10-4 or the input/output unit 18, the value change detecting unit 32 posts the value change to the processor 10-1 so as to return the operating state of the processor to its original state. For example, when the processor is brought into the low-power consumption mode in the detection of the execution of the spinwait command, the operating mode is returned to the normal mode. Further, when the execution of program in the processor is stopped at the time of detecting the execution of the spinwait command, the value change detecting unit 32 restarts the execution of the program.

Figure 5:
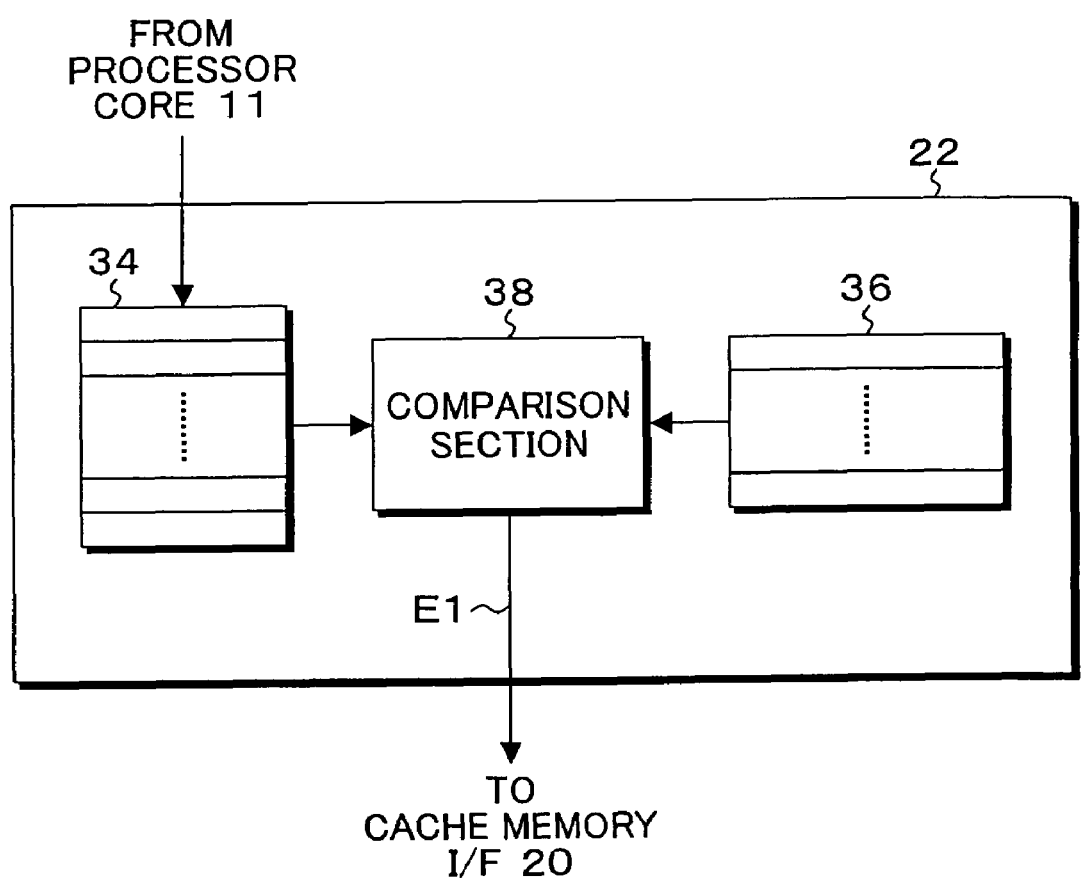
FIG. 5 is a block diagram of a spinwait detecting unit according to the embodiment of the present invention.

FIG. 5 illustrates the spinwait detecting unit 22 provided to the processor 10-1 in FIG. 4 according to the embodiment. The spinwait detecting unit 22 has an executed command string buffer 34, a spinwait command string recording unit 36 and a comparison unit 38. This embodiment exemplifies the case where an existent instruction set ISA (Instruction Set Architecture) is used directly. The spinwait detecting unit 22 records a command string representing spinwait into the spinwait command string recording unit 36 in advance. A plurality of command strings may be recorded thereinto, and the contents to be recorded may be predetermined. A command string which is finished to be executed in the processor core is recorded into the executed command string buffer 34. The comparison unit 38 compares the command string to be a basis recorded in the spinwait command recording unit 36 with the command string recorded in the executed command string buffer 34. When both of them match, namely, the comparison unit 38 detects that the spinwait command string is being executed, it outputs a spinwait command string detected signal E1 to the cache memory interface 20.

Figure 6:
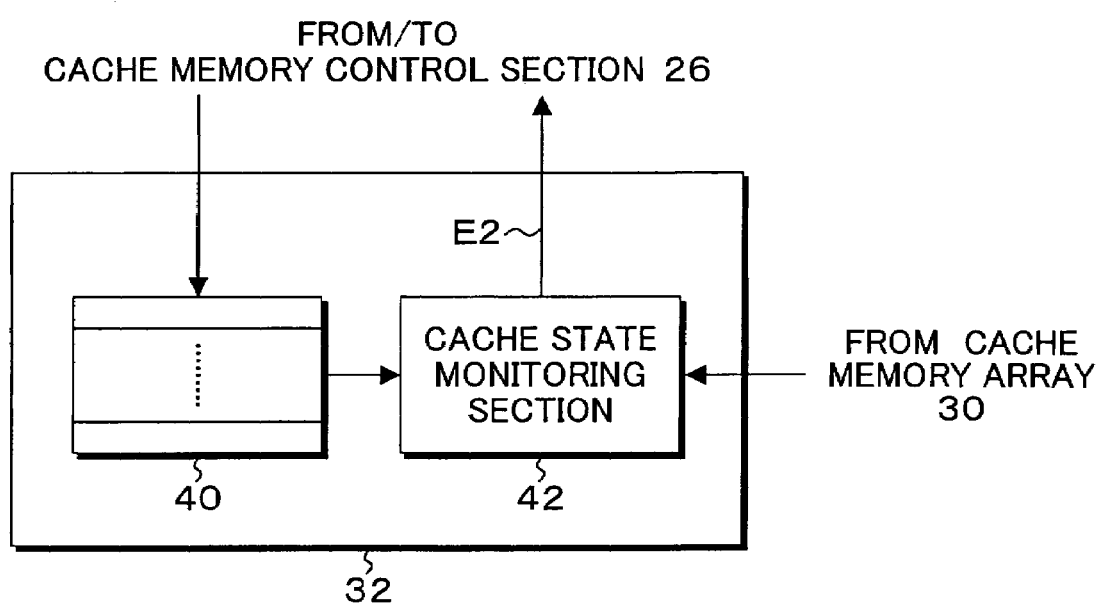
FIG. 6 is a block diagram of a value change detecting unit in FIG. 4 for monitoring a cache block according to the embodiment.

FIG. 6 illustrates the value change detecting unit 32 provided to the cache memory in FIG. 4 according to the embodiment. The value change detecting unit 32 in the embodiment is provided with an address to be monitored recording unit 40 and a cache state monitoring unit 42. When the spinwait is started in the processor by the execution of the spinwait command, the spinwait detecting unit 22 shown in FIG. 5 outputs the spinwait command string detected signal E1, and a cache block into which the variable values referred to as the end condition of the spinwait are stored, concretely, a cache memory entry is received via the cache memory control unit 26 so as to be recorded into the address to be monitored recording unit 40 provided to the value change detecting unit 26 in FIG. 6. The cache state monitoring unit 42 monitors the cache memory entry recorded into the address to be monitored recording unit 40. When a cache state of this entry (cache condition) is updated, the cache state monitoring unit 42 outputs a value change detected signal E2 to the processor via the cache memory control unit 26.

This embodiment exemplifies MESI protocol as the cache protocol, and in this case, when the cache state of the entry to be monitored is updated into invalidation I, the cache state monitoring unit 42 outputs the value change detected signal E2. The cache state monitoring unit 42 outputs the value change detected signal E2 according to the updating of the cache state into invalidating I corresponding to the rewriting of the variable value as the spinwait end condition. The cache state monitoring unit 42 outputs the value change detected signal E2 also when the cache memory entry to be monitored is ejected by LRU algorithm of the cache memory.

Figure 7:
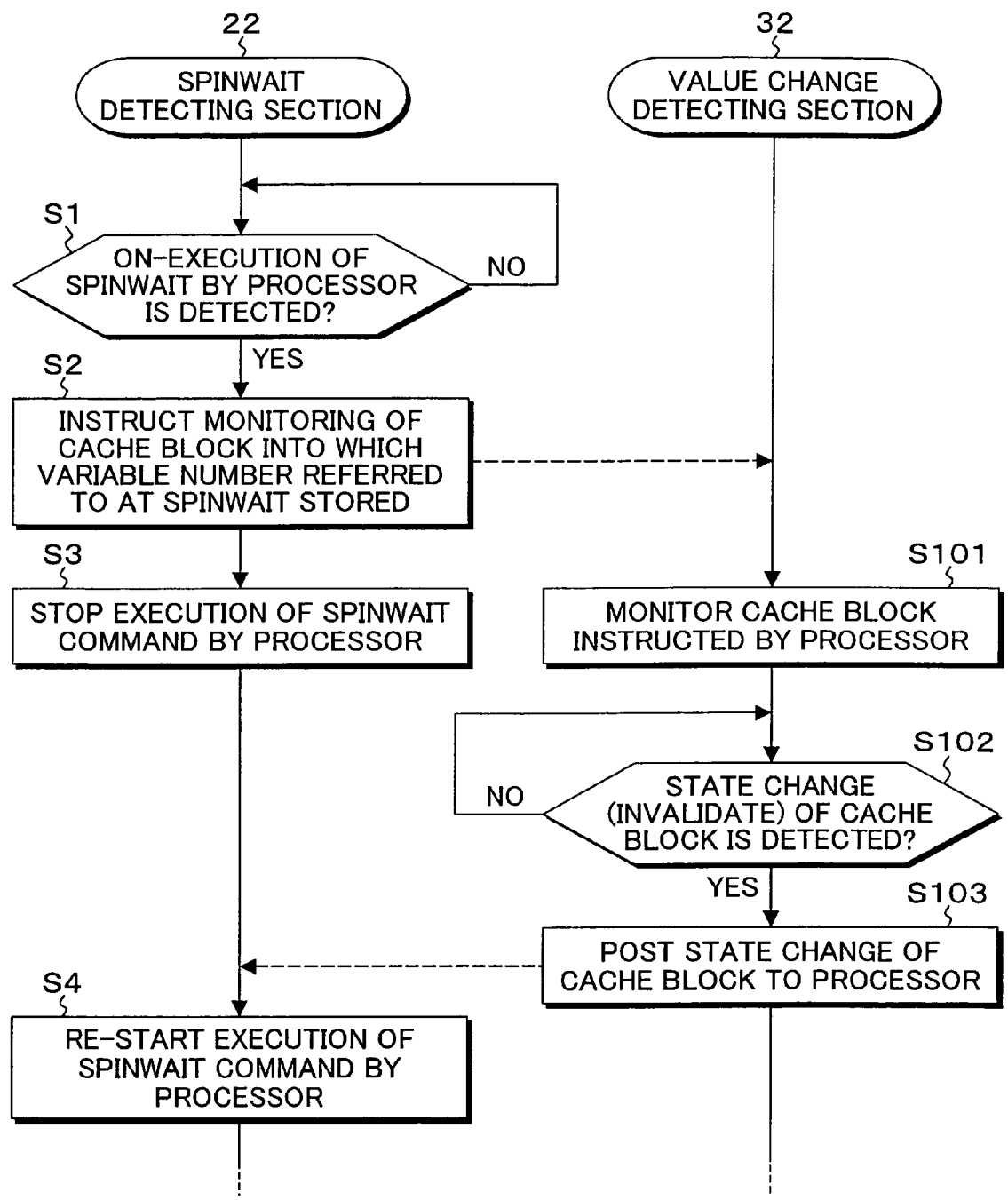
FIG. 7 is a time chart illustrating a processing procedure for monitoring the cache block and detecting a value change at the time of detecting the spinwait according to the present invention.

FIG. 7 is a time chart illustrating a processing procedure of the present invention for monitoring the cache memory entry (cache block) into which the variable values as the spinwait end condition at the time of detecting the spinwait are stored, and detecting the value change. The spinwait detecting unit 22 checks at step S1 whether the spinwait command is being executed in the processor 10-1. When the processor 10-1 executes the spinwait command, the spinwait detecting unit 22 explained in the embodiment with reference to FIG. 5 detects the execution of the spinwait command, and outputs the spinwait command detected signal E1. As a result, the spinwait detecting unit 22 instructs the value change detecting unit 32 on the cache memory 12-1 to monitor the cache block into which the variable values referred to in the spinwait at step S2. At the same time, the spinwait detecting unit 22 stops the execution of the spinwait command by means of the processor 10-1 at step S3, so as brings the processor 10-1 into the low-power consumption operating state.

The value change detecting unit 32, which is instructed to monitor the cache block by the spinwait detecting unit 22, starts to monitor the cache block instructed by the processor at step S101. That is to say, the value change detecting unit 32 detects the cache state in the cache block to be monitored at step S102, namely, a change in the cache state, concretely, invalidation at step S102. When either one of the processors 10-1 to 10-4 or the input/output unit 18 updates the cache block in this state, the cache state of the cache block being monitored into a invalid state. When this state is detected at step S102, the sequence goes to step S103 so that the value change detecting unit 30 in FIG. 6 outputs the state change of the cache block as the value change detected signal E2, and posts the state change of the cache block, namely, invalidation to the processor. When receiving the value change detected signal, the spinwait detecting unit 22 restarts the execution of the spinwait command by means of the processor 10-1 at step S4.

Figure 8A:
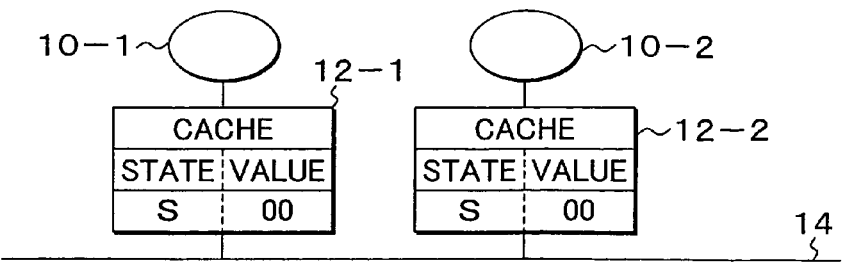
FIGS. 8A to 8G are explanatory diagrams of the synchronizing process according to the present invention.

FIGS. 8A to 8G are explanatory diagrams illustrating the processing procedure of the present invention as the barrier synchronizing process in the multiprocessor system. FIG. 8A illustrates a part of the multiprocessor system subject to the barrier synchronizing process, and exemplifies the barrier synchronizing process between the two processors 10-1 and 10-2 in order to simplify the explanation. Further, in the cache memories 12-1 and 12-2 provided to the processors 10-1 and 10-2, respectively, a two-bit variable value as the spinwait end condition referred to in the execution of the spinwait command and the cache states are shown. The cache states correspond to the MESI protocols. Since the variable values are barrier-synchronized in the two processors 10-1 and 10-2, they are corresponding two-bit information, and they indicate "00" in a state before approaching the synchronizing point.

Figure 1:
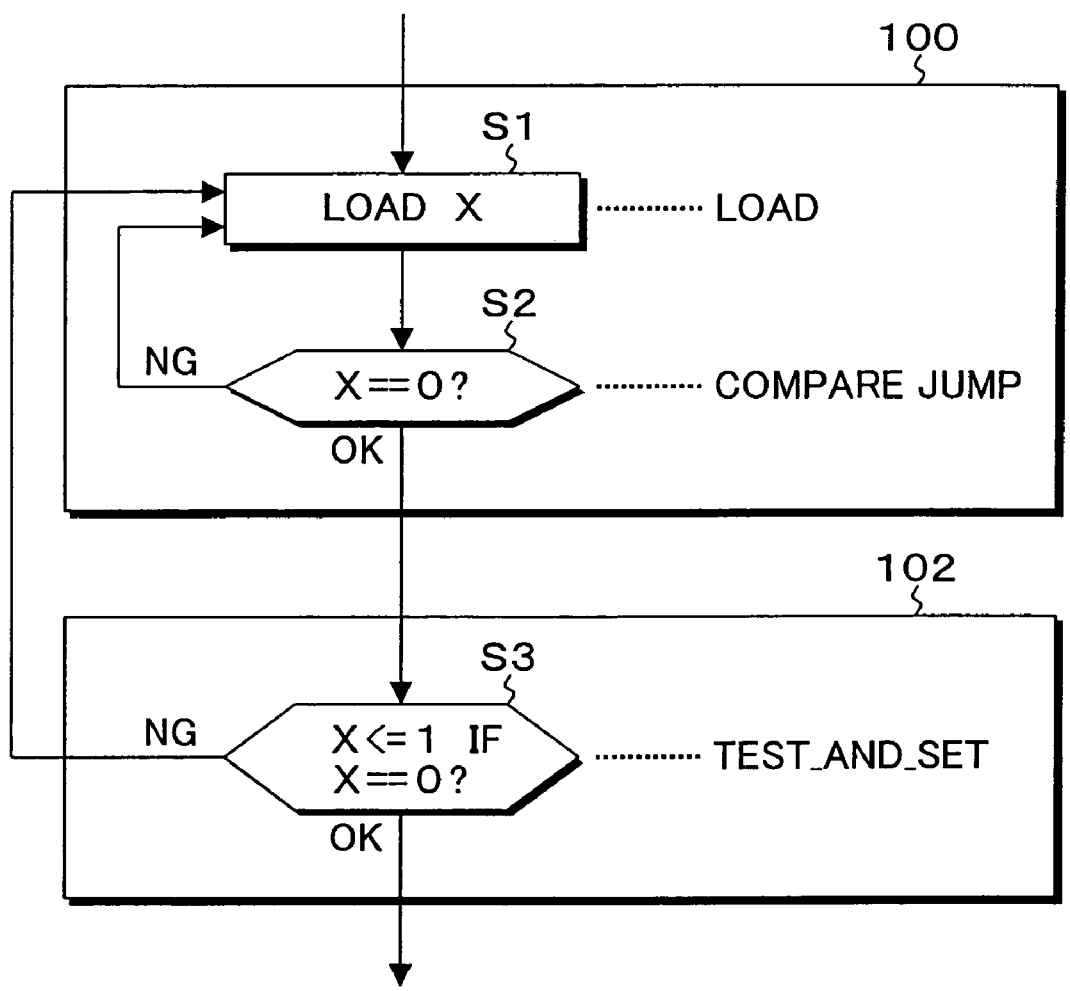
FIG. 1 is an explanatory diagram of a conventional spin lock process.
Figure 2:
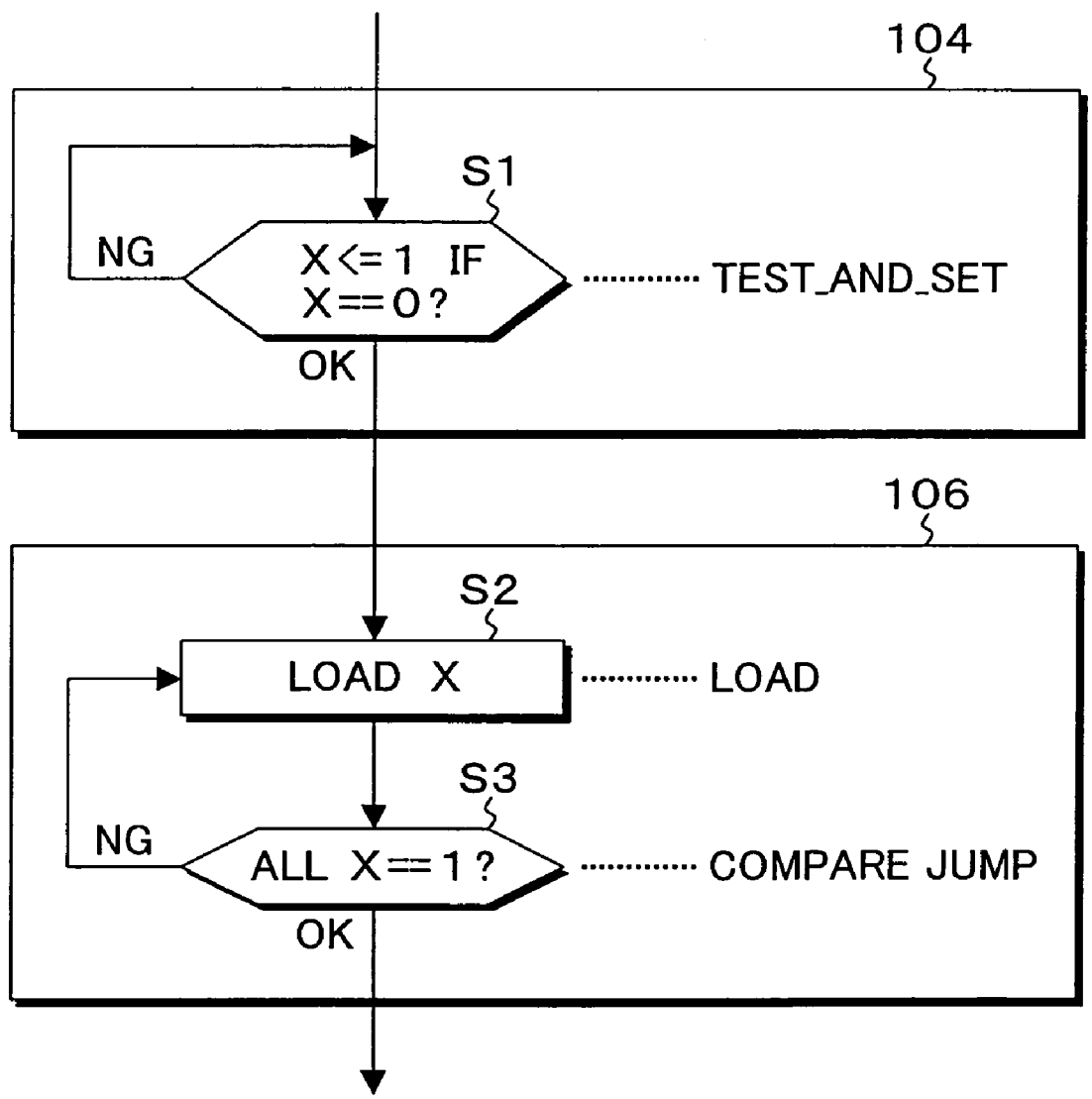
FIG. 2 is an explanatory diagram of a conventional barrier synchronizing process.
Figure 8B:
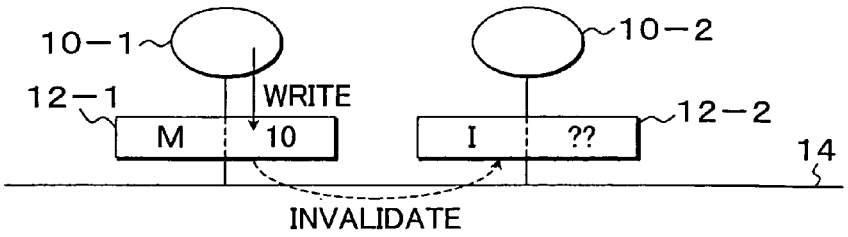

FIGS. 8B to 8G illustrate operational transition states of the barrier synchronizing process according to the processing procedure of the present invention shown in FIG. 7 in a time-base divided manner. FIG. 8B illustrates a state that the processor 10-1 of the two processors 10-1 and 10-2 to be subject to the barrier synchronization reaches the synchronizing point so as to be in a spinwait state. That is to say, the processor 10-1 sets a corresponding bit of the variable value as the objective entries in the cache memory 12-1 at the time of approaching the synchronizing point according to the process of the setting unit 104 shown in FIG. 2. As a result, the variable value is changed form "00" into "01". When the variable value in the cache memory 12-1 is updated, the cache state is invalidated in the cache memory 12-2 of the processor 10-2 having the same cache block. The cache state of the corresponding cache block in the cache memory 12-1 is updated into change M.

Figure 8C:
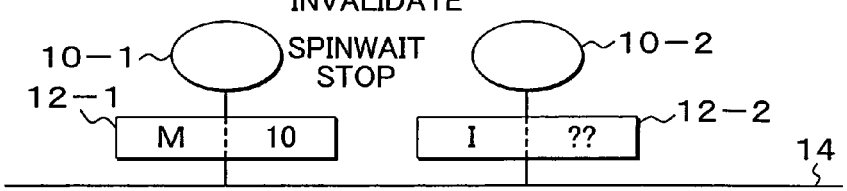

When the processor 10-1 is in the spinwait state as shown in FIG. 8B, the spinwait detecting unit 22 provided to the processor 10-1 detects the execution of the spinwait command as shown in FIG. 4, and instructs the cache memory 12-1 to monitor whether the cache state of the corresponding cache block is invalid I. At the same time, the spinwait detecting unit 22 makes the processor 10-1 stop the execution of the spinwait program, for example. As a result, the processor 10-1 is in a state that the execution of the spinwait program is stopped as shown in FIG. 8C, whereas the processor 10-2 continues the execution of the program in the normal mode.

Figure 8D:
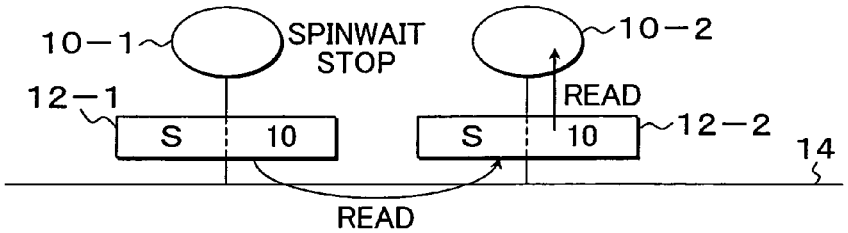
Figure 8E:
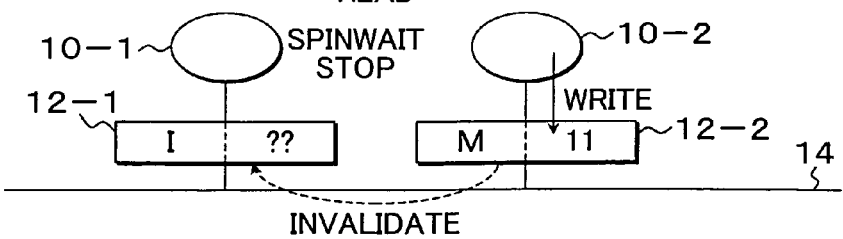

FIG. 8D illustrates a process when the processor 10-2 reaches the synchronizing point. When the processor 10-2 reaches the synchronizing point, it reads the variable value as the spinwait end condition from the cache memory 12-2 by executing the spinwait command. Since the corresponding cache block of the cache memory 12-2 is in the invalid I state at this time, the variable value is read form the cache memory 12-2 of the processor 10-1 by the cache protocol, and after the cache state is brought into a share S state, the variable value is read by the processor 10-2. Thereafter, as shown in FIG. 8E, the processor 10-2 rewrites the bit allocated to itself into 1, so as to set the variable value to "11". The variable value is invalidated for the cache memory 12-1 of the processor 10-1 in the program stop state by the updating of the variable number, and the cache state is updated from share S into invalidation I. When the value change detecting unit 32 provided to the cache memory 12-1 in FIG. 4 detects the state change in the cache memory 12-1 into the invalidation I, the value change detecting unit 32 posts the value change to the processor 10-1. As a result, the execution of the stopped program is restarted.

Figure 8F:
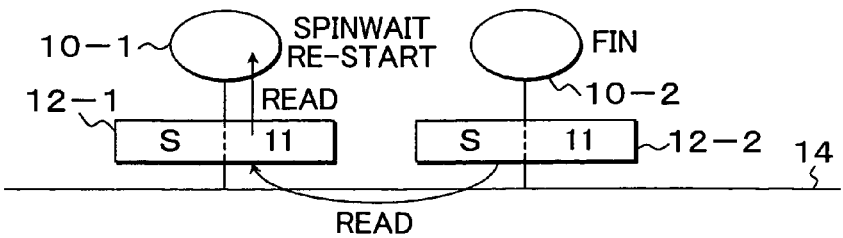
Figure 8G:
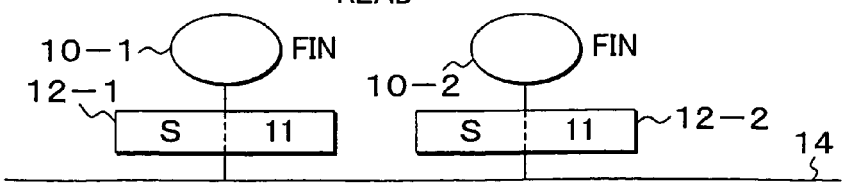

For this reason, the processor 10-1 which restarts the execution of the program reads the variable value "11" of the corresponding cache block in the cache memory 12-1 according to the execution of the spinwait command in FIG. 8F. As a result, it recognizes that the spinwait end condition is established. At this time, in the processor 12-2, the spinwait end condition is determined by recognition of the variable value "11", and thus the barrier synchronization is established between the two processors 10-1 and 10-2, and the spinwait is ended as shown in FIG. 8G so that the sequence goes to the program executing process.

Figure 9:
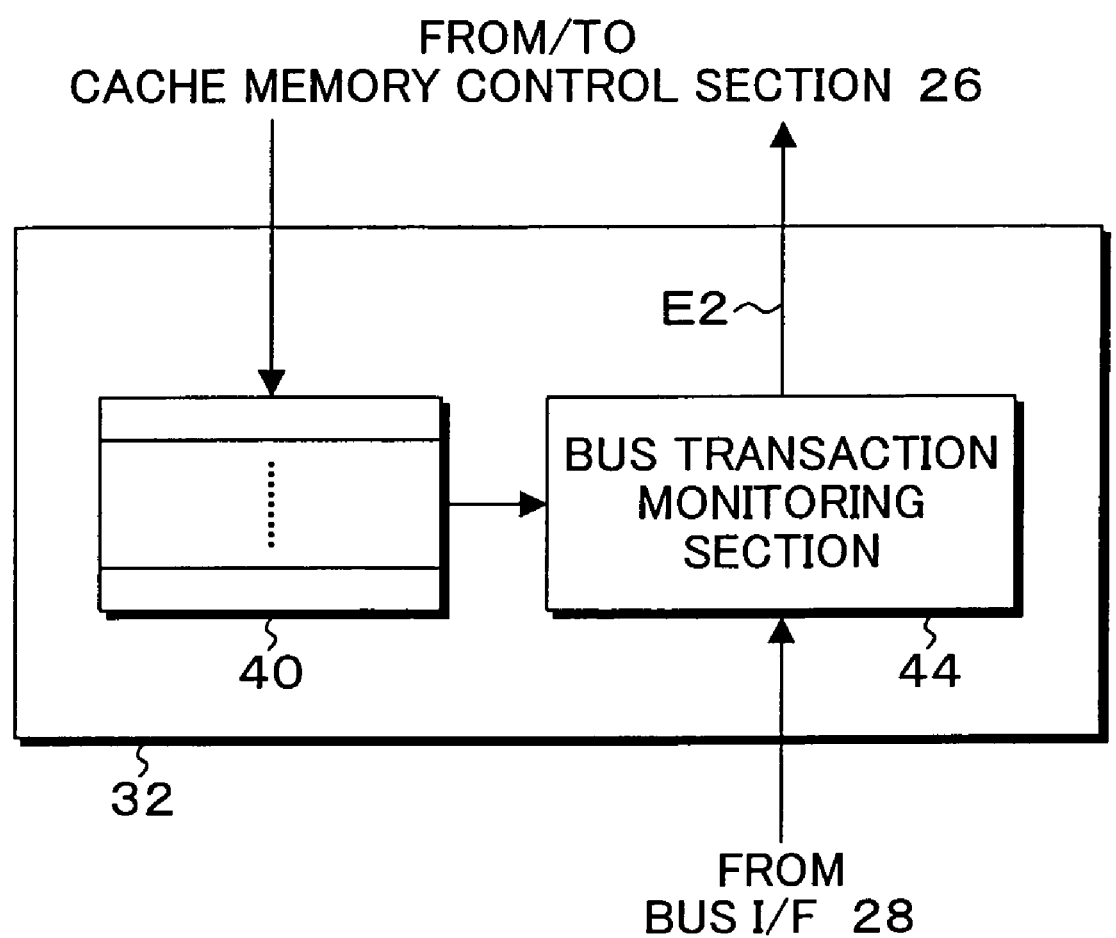
FIG. 9 is a block diagram of the value change detecting unit in FIG. 4 for monitoring bus transaction according to another embodiment.

FIG. 9 illustrates the value change detecting unit 32 provided to the cache memory 12-1 in FIG. 4 according to another embodiment. This embodiment is characterized in that the value change detecting unit 32 monitors bus transaction (bus request) such that another processor or the input/output unit changes the variable value for the cache block which stores the variable value as the spinwait end condition thereinto, so as to detect the value change.

In the value change detecting unit 32 in FIG. 9, a bus transaction monitoring unit 44 is provided to the address to be monitored recording unit 40 which is the same as that in FIG. 6. When the spinwait command is started to be executed in the processor, a data address referred to in the spinwait is recorded into the address to be monitored recording unit 40. The bus transaction monitoring unit 44 monitors the transaction by the bus 14 from another processor with respect to the address to be monitored or the input/output unit via the bus interface 28. When the bus transaction monitoring unit 44 detects the monitoring bus transaction, it outputs the value change detected signal E2 to the processor via the cache memory control unit 26. When the value change is detected by monitoring the bus transaction, a change in the variable value as the spinwait end condition is not directly detected, but actually a detection is made that the variable value is possibly changed.

Figure 10:
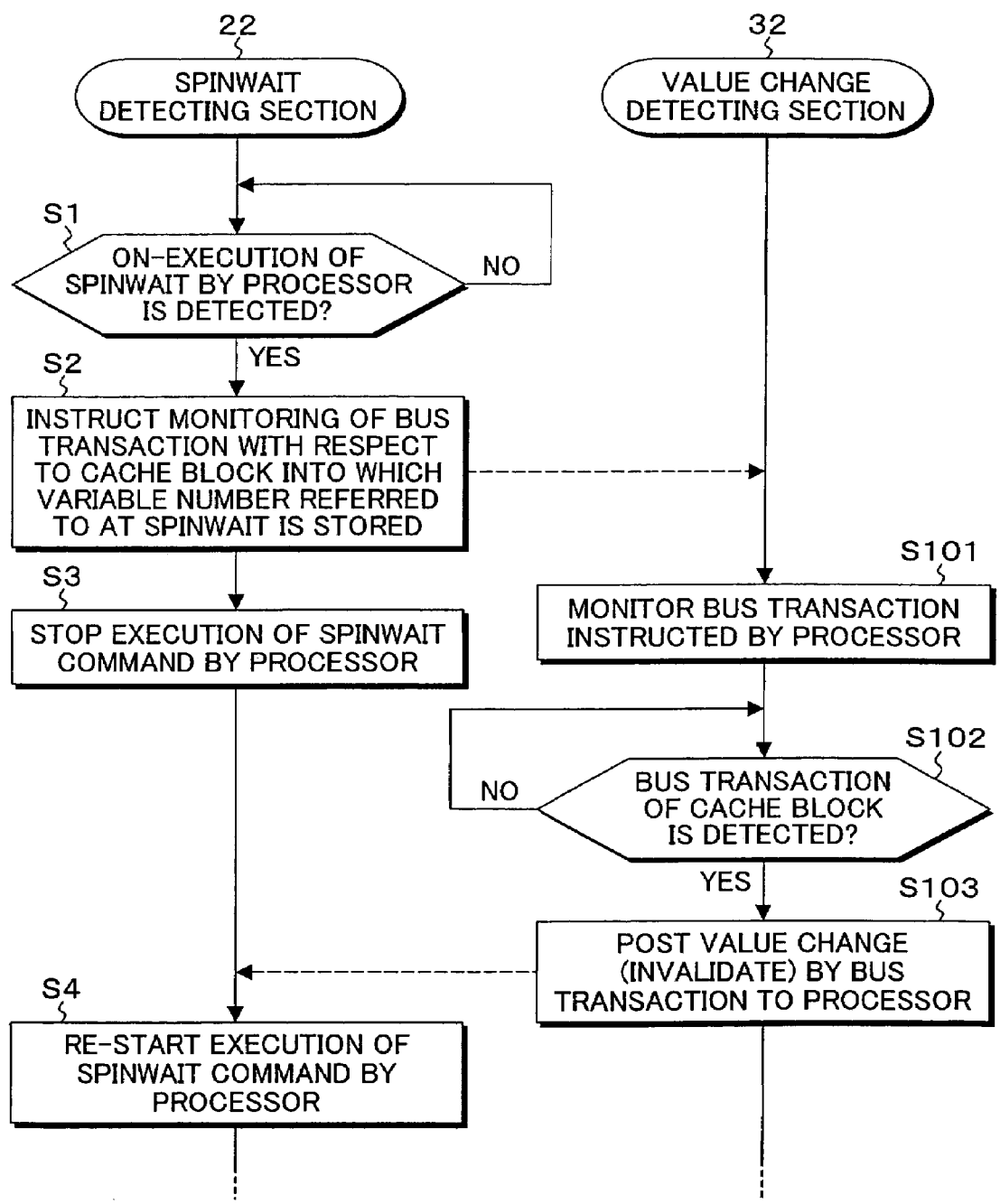
FIG. 10 is a time chart of a processing procedure of the present invention for monitoring the bus transaction and detecting a value change at the time of detecting the spinwait.

FIG. 10 is a time chart illustrating the processing procedure of the present invention when the value change is detected by monitoring the bus transaction shown in FIG. 9. When the spinwait detecting unit 22 detects the execution of the spinwait command in the processor at step S1, it instructs the value change detecting unit 32 on the cache memory to monitor the cache block which stores the variable value referred to in the spinwait command thereinto, namely, the data address at step S2. The spinwait detecting unit 22 outputs the spinwait command string detection to the processor so as to stop the execution of the spinwait command by means of the processor at step S3.

The value change detecting unit 32 on the cache memory side monitors the bus transaction for the data address instructed by the processor at step S101, and detects the bus transaction for the cache block to be monitor at step S102. The value change detecting unit 32 then outputs the value change detected signal so as to post the state change (possibility) due to the bus transaction to the processor at step S103. The spinwait detecting unit 22 which receives the post restarts the execution of the spinwait command by means of the processor at step S4.

Another embodiment of the present invention in which the allocation of the processor resources to the processor which is executing the spinwait command is reduced by exemplifying the case where the SMT processors are used as the processors 10-1 to 10-4 in FIG. 3.

Figure 11:
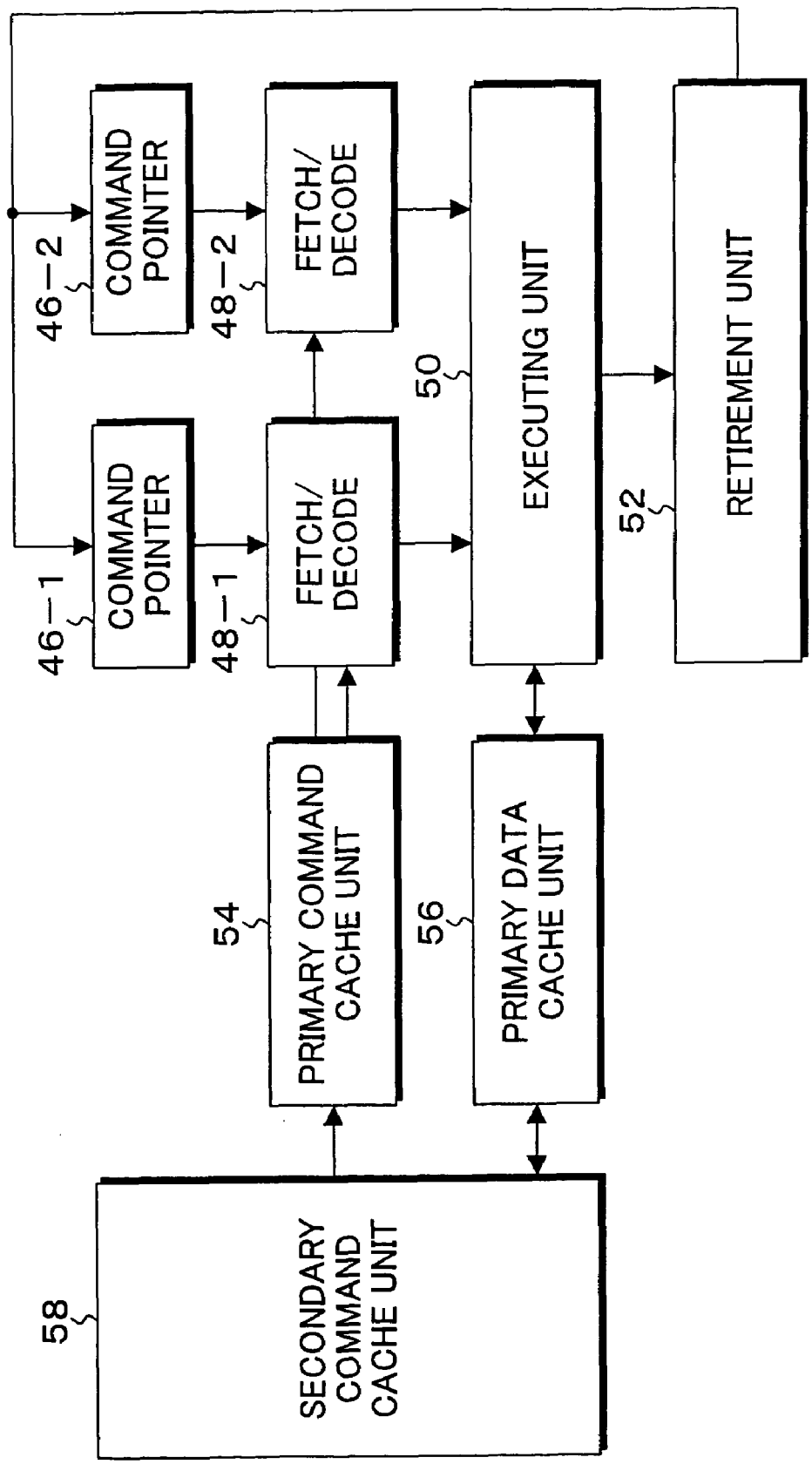
FIG. 11 is a block diagram illustrating a schematic constitution of an SMT processor into which the present invention is adopted.

FIG. 11 illustrates a schematic constitution of the SMT processor to which the present invention is adopted. The SMT processor has command pointers 46-1 and 46-2, fetch/decode 48-1 and 48-2, an execution unit 50, a retirement unit 52, a primary command cache unit 54, a primary data cache unit 56 and a secondary cache unit 58. The SMT processor having such a schematic constitution normally has a plurality of command pointers in order to execute a plurality of threads simultaneously. In this example, the SMT processor has the two command pointers 46-1 and 46-2. When two threads are executed by the command pointers 46-1 and 46-2, and the fetch/decode 48-1 and 48-2, the resource such as the execution unit 50 is shared between the threads, so that the effective capacity factor of the resources is heightened. This is the aim of the SMT processor. In the SMT processor in which the processor resource is shared between a plurality of threads, various ways, which determine which thread having a command to be next allocated to the execution unit 50, are suggested. The present invention can be, therefore, used for determining the way for determining which command of a thread the processor resource such as the execution unit is allocated to. Concretely, when the thread which is executing the spinwait is detected, the allocation of the processor resource such as the execution unit to the thread which is executing the spinwait command is reduced or stopped. As a result, a chance to allocate a command of another thread which is executing not the spinwait but a more meaningful command to the execution unit is increased, and thus the processing performance of the SMT processor can be expected to be improved.

Figure 12:
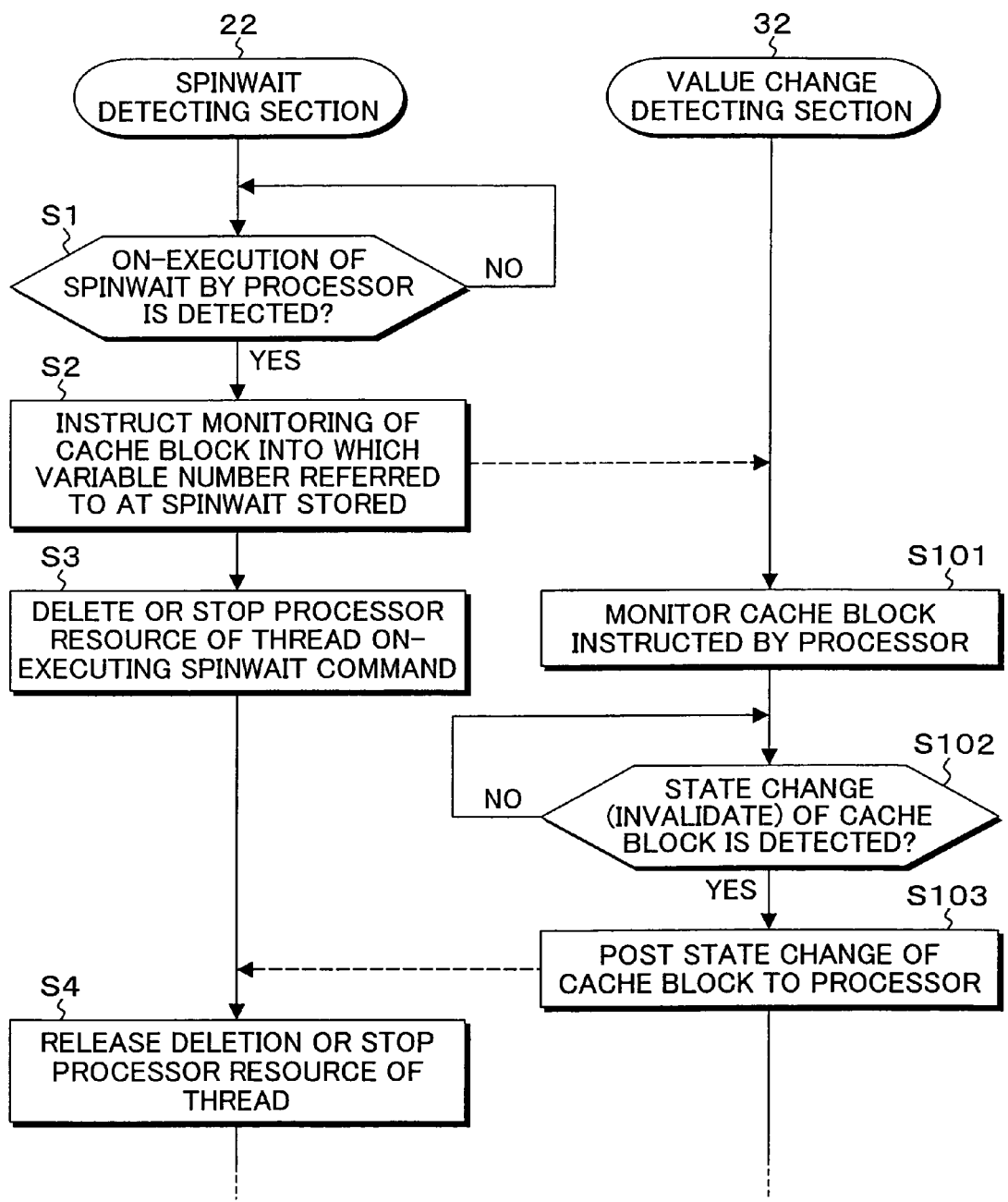
FIG. 12 is a time chart illustrating a processing procedure of the present invention for detecting the spinwait and deleting a processor resource.

FIG. 12 is a time chart illustrating the processing procedure of the present invention for detecting the spinwait in the SMT processor so as to reduce the processor resources. The spinwait detecting unit 22 on the SMT processor checks whether the spinwait is being executed in one of the plural threads at step S1. When the spinwait detecting unit 22 detects the execution, the sequence goes to step S2, so that it instructs the value change detecting unit 32 on the cache memory to monitor the cache block into which the variable value referred to in the spinwait are stored. The spinwait detecting unit 22 reduces or stops the processor resources-into which the command of the thread executing the spinwait command at step S3. Concretely, when the execution of the spinwait is detected by the command of the thread executed in the command pointer 46-1 and the fetch/decode 48-1, for example, the allocation of the command in the thread to the execution unit 50 is reduced or stopped. The execution unit 50 is allocated to the command in another thread on the side of the command pointer 46-2 and the fetch/decode 48-2 executing a command other than the spinwait command.

The value change detecting unit 32 on the cache memory side monitors the cache state of the cache block instructed by the processor at step S101. When the value change detecting unit 32 detects that the cache state, namely, the state is updated into invalidation I at step S102, it posts the state change of the cache block to the processor at step S103. The spinwait detecting unit 22 which receives the post releases the deletion or stopping of the allocation of the processor resource to the thread which is executing the spinwait command at step S4.

The above embodiments exemplify the MESI protocol as the cache protocol, but suitable cache protocols may be used as long as they include updating into the invalidation I.

In the above embodiments, the cache state of the cache block corresponding to the variable value as the spinwait end condition is invalidated, or the variable value which is the cache end condition is monitored directly or indirectly by the bus transaction for the cache state. Needless to say, however, another variable value may be monitored directly or indirectly. In the above embodiments, as to the change in the operating state of the processor at the time when the execution of the spinwait is detected, the operating state is changed into the low-power consumption mode, the execution of the program is stopped, and the allocation of the processor resources in the SMT processor is reduced or stopped. This change, however, includes another suitable changes in the operating state of the processor in which wastefulness due to the execution of the spinwait command is omitted. The present invention is not limited to the above embodiments, and includes suitable modifications which do not deteriorate its advantages and objects. Further, the present invention is not limited by numerical values explained in the above embodiments.

INDUSTRIAL APPLICABILITY

According to the present invention, wasteful command execution and operation of the processor caused by the execution of the spinwait command can be limited without deteriorating low delay which is the characteristic of the spinwait. As a result, the power consumption of the processor can be reduced.

In the SMT processor, bad influences of the thread executing the spinwait on another threads can be avoided, and the processing performance of the SMT processor can be improved.

The invention claimed is:

1. A computer having a plurality of processors, comprising:
  a spinwait detecting unit detecting execution of a spinwait command by at least one of the plurality of processors, instructing monitoring of a variable value as an end condition of the detected spinwait command and changing an operating state of said at least one of the plurality of processors to a different state in accordance with the detected spinwait command; and
  a value change detecting unit monitoring the variable value as the end condition of the detected spinwait command instructed by the spinwait detecting unit, and when detecting a change in the variable value as the end condition of the detected spinwait command, posting the value change to said at least one of the plurality of processors to return the operating state into an original state.

2. The computer according to claim 1, wherein when the spinwait detecting unit detects the execution of the spinwait command by said at least one of the plurality of processors, the value change detecting unit is instructed by the spinwait detecting unit to monitor a cache block of a cache memory of said at least one of the plurality of processors with the cache block storing the variable value as the end condition of the detected spinwait command, and
  the value change detecting unit monitors the cache block of said cache memory of said at least one of the plurality of processors instructed by the spinwait detecting unit, and when detecting the change in the state of the cache block of said cache memory of said at least one of the plurality of processors, the value change detecting unit posts the value change to said at least one of the plurality of processors.

3. The computer according to claim 2, wherein the value change detecting unit detects an invalid state of the cache block of said cache memory of said at least one of the plurality of processors when another one of the plurality of processors or an input/output unit updates the cache block of said cache memory of said at least one of the plurality of processors, and the value change detecting unit posts the value change to said at least one of the plurality of processors.

4. The computer according to claim 2, wherein when the value change detecting unit detects the cache block of said cache memory of said at least one of the plurality of processors is put out of said cache memory of said at least one of the plurality of processors, the value change is posted to said at least one of the plurality of processors by the value change detecting unit.

5. The computer according to claim 1, wherein when the spinwait detecting unit detects the execution of the spinwait command by said at least one of the plurality of processors, the value change detecting unit is instructed to monitor a bus request to a memory address of a cache block of a cache memory of said at least one of the plurality of processors for storing the variable value as the end condition of the detected spinwait command, and the value change detecting unit monitors the bus request to the memory address of said cache block of said cache memory of said at least one of the plurality of processors for storing the variable value as the end condition of the detected spinwait command thereinto instructed by the spinwait detecting unit, and when detecting the bus request to the memory address of said cache block of said cache memory of said at least one of the plurality of processors from another one of the plurality of processors or an input/output unit, the value change is posted to said at least one of the plurality of processors by the value change detecting unit.

6. The computer according to claim 1, wherein said at least one of the plurality of processors has at least two or more operating modes including a normal mode and a low-power consumption mode, with the spinwait detecting unit changing one of said at least two or more operating modes of said at least one of the plurality of processors into the low-power consumption mode when detecting the execution of the spinwait command, and
  when the value change detecting unit detects a change in the variable value as the spinwait end condition of the detected spinwait command, another one of said at least two or more operating modes of said at least one of the plurality of processors is changed into the normal mode by the value change detecting unit.

7. The computer according to claim 1, wherein the plurality of processors have a function for stopping the execution of a program, when the spinwait detecting unit detects the execution of the spinwait command, and said at least one of the plurality of processors is instructed to stop the execution of the program by the spinwait detecting unit, and
  when the value change detecting unit detects a change in the variable value as the spinwait end condition, said at least one of the plurality of processors is instructed to restart the execution of the program by the value change detecting unit.

8. The computer according to claim 1, wherein the plurality of processors have a constitution such that a plurality of threads can be executed simultaneously, and when the spinwait detecting unit detects one of said plurality of threads which is executing the spinwait command, allocation of a processor resource to said one of said plurality of threads is reduced or stopped, and
  the value change detecting unit detects the change in the variable value as the spinwait end condition, and the allocation of the processor resource is increased or restarted to said one of said plurality of threads.

9. The computer according to claim 1, wherein said at least one of the plurality of processors has a command for an exclusive use of the detected spinwait command, and the spinwait detecting unit detects the execution of the spinwait command from the execution of the command for the exclusive use of the spinwait command by said at least one of the plurality of processors.

10. The computer according to claim 1, further comprising:
  a buffer storing a command string executed by said at least one of the plurality of processors thereinto; and
  a spinwait command string recording unit recording a command string executed by said at least one of the plurality of processors for exclusive use of the detected spinwait command thereinto, and when the buffer and the spinwait command string recording unit are compared and match, the execution of the spinwait command by said at least one of the plurality of processors is detected.

11. A control method for a computer having a plurality of processors, wherein when an execution of a spinwait command by at least one of the plurality of processors is detected, a variable value as an end condition of the executed spinwait command is monitored, and an operating state of said at least one of the plurality of processors is changed to a different state in accordance with the detected spinwait command, wherein when a change in the monitored variable value as an end condition of the executed spinwait command is detected, the value change is posted to said at least one of the plurality of processors so that the operating state is returned to an original state.

12. The computer control method according to claim 11, wherein when the execution of the spinwait command by said at least one of the plurality of processors is detected, a cache block of a cache memory of said at least one of the plurality of processors for storing the variable value as an end condition of the executed spinwait command is monitored, and when a change in a state of the cache block of the cache memory of said at least one of the plurality of processors is detected while monitoring the cache block of the cache memory of said at least one of the plurality of processors, the value change is posted to said at least one of the plurality of processors.

13. The computer control method according to claim 12, wherein when a detection is made that the state of the cache block of the cache memory of said at least one of the plurality of processors is invalid when another one of the plurality of processors or an input/output unit updates the cache block of said at least one of the plurality of processors, the value change is posted to said at least one of the plurality of processors.

14. The computer control method according to claim 12, wherein when a detection is made that the cache block of the cache memory of said at least one of the plurality of processors is ejected from the cache memory of said at least one of the plurality of processors, the value change is posted to said at least one of the plurality of processors.

15. The computer control method according to claim 11, wherein when the execution of the spinwait command by said at least one of the plurality of processors is detected, a bus request to a memory address of a cache block of a cache memory of said at least one of the plurality of processors for storing the variable value as an end condition of the executed spinwait command is monitored, and when the bus request to the memory address of said cache block of said cache memory of said at least one of the plurality of processors from another one of the plurality of processors or an input/output unit is detected during the monitoring of the bus request to the memory address of said cache block of said cache memory of said at least one of the plurality of processors, the value change is posted to said at least one of the plurality of processors.

16. The computer control method according to claim 11, wherein said at least one of the plurality of processors has at least two operating modes including a normal mode and a low-power consumption mode, and when the execution of the spinwait command by at least one of the plurality of processors is detected, one of said at least two operating modes of said at least one of the plurality of processors is changed into the low-power consumption mode, and when the change in the monitored variable value as an end condition of the executed spinwait command is detected, another one of said at least two operating modes of said at least one of the plurality of processors is changed into the normal mode.

17. The computer control method according to claim 11, wherein said at least one of the plurality of processors has a function for stopping the execution of a program, and when the execution of the spinwait command is detected, said at least one of the plurality of processors is instructed to stop the execution of the program, and when the change in the variable value as the spinwait end condition is detected, said at least one of the plurality of processors is instructed to restart the execution of the program.

18. The computer control method according to claim 11, wherein said at least one of the plurality of processors has a constitution such that a plurality of threads can be executed simultaneously, and when one of said plurality of threads which is executing the spinwait command is detected, an allocation of a processor resource to said one of said plurality of threads is reduced or stopped, and when the change in the monitored variable value as the spinwait end condition is detected, the allocation of the processor resource to said one of said plurality of threads is increased or restarted.

19. The computer control method according to claim 11, wherein said at least one of the plurality of processors has a command for an exclusive use of the spinwait command, and the execution of the spinwait command by at least one of the plurality of processors is detected from an execution of the command for the exclusive use of the spinwait command by said at least one of the plurality of processors.

20. The computer control method according to claim 19, further comprising:
    a spinwait detecting unit recording a command string for exclusive use of the spinwait command is into a spinwait command string recording units; and
    an executed command string by said at least one of the plurality of processors is sequentially stored into a buffer of the spinwait detecting unit, wherein
    when the buffer and the spinwait command string recording unit are compared and match, the execution of the spinwait command is detected.

21. An apparatus comprising:
    a first unit changing an operating state of a processor from an original state to a different state in accordance with execution of a spinwait command by the processor; and
    a second unit returning the processor to the original state when a variable value as an end condition of the spinwait command changes.

22. An apparatus comprising:
    means for changing an operating state of a processor from an original state to a different state in accordance with execution of a spinwait command by the processor; and
    means for returning the processor to the original state when a variable value as an end condition of the spinwait command changes.

* * * * *

UNITED STATES PATENT AND TRADEMARK OFFICE
CERTIFICATE OF CORRECTION

PATENT NO. : 7,337,274 B2 Page 1 of 1
APPLICATION NO. : 10/841619
DATED : February 26, 2008
INVENTOR(S) : Akira Naruse et al.

It is certified that error appears in the above-identified patent and that said Letters Patent is hereby corrected as shown below:

Col. 12, line 24, after "program" delete ","

Col. 14, line 35, after "command" delete "is"

Col. 14, line 36, delete "units;" and insert --unit;--, therefor.

Signed and Sealed this

Eighth Day of July, 2008

JON W. DUDAS
*Director of the United States Patent and Trademark Office*

UNITED STATES PATENT AND TRADEMARK OFFICE
CERTIFICATE OF CORRECTION

PATENT NO. : 7,337,274 B2  Page 1 of 1
APPLICATION NO. : 10/841619
DATED : February 26, 2008
INVENTOR(S) : Akira Naruse et al.

It is certified that error appears in the above-identified patent and that said Letters Patent is hereby corrected as shown below:

On the Title Page:

Item (63) Related U. S. Application Data, insert:

--(63) This application is a continuation of Application No. PCT/JP01/09788, filed on November 8, 2001.--

In the Specifications:

Col. 1, line 2, insert:

--This application is a continuing application, filed under 35 U.S.C. §111(a), of International Application No. PCT/JP01/09788, filed November 8, 2001.--

Signed and Sealed this
Fourth Day of February, 2014

Michelle K. Lee
*Deputy Director of the United States Patent and Trademark Office*